US012732641B2

(12) United States Patent
Meardi

(10) Patent No.: US 12,732,641 B2
(45) Date of Patent: Sep. 8, 2026

(54) VIDEO ENCODING USING PRE-PROCESSING

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/254,364

(22) PCT Filed: Nov. 26, 2021

(86) PCT No.: PCT/GB2021/053070
§ 371 (c)(1),
(2) Date: May 24, 2023

(87) PCT Pub. No.: WO2022/112774
PCT Pub. Date: Jun. 2, 2022

(65) Prior Publication Data

US 2024/0040160 A1 Feb. 1, 2024

(30) Foreign Application Priority Data

Nov. 27, 2020 (GB) ..................................... 2018742

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/132* (2014.11); *H04N 19/136* (2014.11)

(58) Field of Classification Search
None
See application file for complete search history.

(56) References Cited

U.S. PATENT DOCUMENTS

2011/0317755 A1* 12/2011 Lancaster ............ H04N 19/132 375/E7.029
2013/0294523 A1* 11/2013 Rossato ............... H04N 19/187 375/240.18
2016/0014411 A1* 1/2016 Sychev .................. H04N 19/82 375/240.12
2020/0107027 A1* 4/2020 He ........................ H04N 19/33

FOREIGN PATENT DOCUMENTS

CN 111711817 9/2020
CN 116582685 8/2023
(Continued)

OTHER PUBLICATIONS

Minopoulos et al. (QoE Assessment of Video Codecs for Video Streaming over 5G Networks : Oct. 9-11, 2020) (Year: 2020).*
(Continued)

*Primary Examiner* — Samuel D Fereja
(74) *Attorney, Agent, or Firm* — Workman Nydegger

(57) ABSTRACT

There is provided a technique for video encoding. The technique comprises downsampling at a downsampler (820), an input video stream at a first resolution (805) to a second resolution (825), the second resolution being lower than the first resolution. The technique uses a set of encoders to encode signals derived from the input video stream at the first spatial resolution and the second spatial resolution. There is also provided a pre-processing stage (830) to pre-process the input video stream at the first resolution (805) prior to the downsampling at downsampler (820). The pre-processing comprises an application of a blurring filter (810) and a sharpening filter (815).

20 Claims, 12 Drawing Sheets

(51) Int. Cl.

| | |
|---|---|
| ***H04N 19/132*** | (2014.01) |
| ***H04N 19/136*** | (2014.01) |

(56) References Cited

FOREIGN PATENT DOCUMENTS

| | | | |
|---|---|---|---|
| GB | 2061362 | 5/1981 | |
| GB | 2601362 A | 6/2022 | |
| WO | WO-2019111010 A1 * | 6/2019 | ............ G06F 17/16 |
| WO | 2020212701 | 10/2020 | |
| WO | 2022011571 | 1/2022 | |

OTHER PUBLICATIONS

Meardi et al. (MPEG-5 part 2: Low Complexity Enhancement Video Coding (LCEVC): "Overview and performance evaluation", Aug. 21, 2020 {Note: Reference [4]}) (Year: 2020).*

Combined Search Examination Report for GB2310451.6 mailed on Nov. 28, 2023.

International Search Report for application No. GB2018742.3 mailed on Mar. 30, 2022.

Meardi Guido et al, "MPEG-5 part 2: Low Complexity Enhancement Video Coding (LCEVC): Overview and performance evaluation", SPIE Proceedings; [Proceedings of SPIE ISSN 0277-786X], SPIE, US, vol. 11510, Aug. 21, 2020 (Aug. 21, 2020), p. 115101C-115101C, XP060133717.

A. Polesel et al, "Image enhancement via adaptive unsharp masking", IEEE Transactions on Image Processing, vol. 9, No. 3, Mar. 1, 2000 (Mar. 1, 2000), p. 505-510, XP055104081.

International Preliminary Report on Patentability received for PCT Patent Application No. PCT/GB2021/053070, mailed on Jun. 8, 2023, 8 pages.

International Search Report and Written Opinion received for PCT Patent Application No. PCT/GB2021/053070, mailed on Mar. 30, 2022, 12 pages.

* cited by examiner

Data frame
210
200
$201_{-1}$
$201_{-2}$
$201_{1-n}$
$202_{-1}$
$202_{-2}$
$202_{1-n}$
$203_0$
$203_{-1}$
$203_{-2}$
$R_{-0}$
$R_{-1}$
$R_{-2}$
$R_{1-n}$ Decoded video
750
Up sampling
713
715
712
Base decoder
710
L-2 encoding
714
L-1 decoding
711
Headers
Encoded level 2 stream
Encoded level 1 stream
Encoded base stream
704
703
702
701

VIDEO ENCODING USING PRE-PROCESSING

CROSS-REFERENCE TO RELATED APPLICATIONS

This application is a 371 US Nationalization of International Application No. PCT/GB2021/053070, filed Nov. 26, 2021, which claims priority to United Kingdom Patent Application No. 2018742.3, filed Nov. 27, 2020, the disclosures of which are hereby incorporated by reference herein in their entirety.

TECHNICAL FIELD

The present invention relates to methods for processing signals, such as by way of non-limiting examples video, image, hyperspectral image, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not be multiplexed in a single bitstream.

BACKGROUND

In tier-based coding formats such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" ("LoQ") of the signal, from the highest echelon at the sampling rate of the original signal to a lowest echelon, which typically has a lower sampling rate than the original signal. In the non-limiting example when the signal is a frame of a video stream, the lowest echelon may be a thumbnail of the original frame, or even just a single picture element. Other echelons contain information on corrections to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise a lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher— Level of Quality, and so on, up to reconstructing the given Level of Quality. Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution.

When generating a hierarchical signal encoding there is a desire to be able to control the content of different layers of encoding. For example, in schemes such as LCEVC and VC-6 it may be desirable to control the content of the one or more residual streams that are generated, e.g. in a global manner. In one case, it may be desired to reduce an information content of a residual stream, e.g. reduce the amount of residual data that needs to be transmitted, and/or generate residual data that has a more easily compressible form, e.g. when applying one or more of run-length encoding and Huffman encoding.

When encoding a signal, such as an audio and/or video signal, there is also often a need to apply signal processing operations to accommodate real-time frame rates, e.g. at frequencies of 30 or 60 Hz—i.e. 33 ms or 16 ms per frame. Processing often also needs to be performed on resource-limited devices, such as during video conferencing on a battery-power mobile device and/or sending surveillance video from an edge capture device.

SUMMARY

Aspects and variations of the present invention are set out in the appended claims.

Certain unclaimed aspects are further set out in the detailed description below.

DETAILED DESCRIPTION

Figure 1:
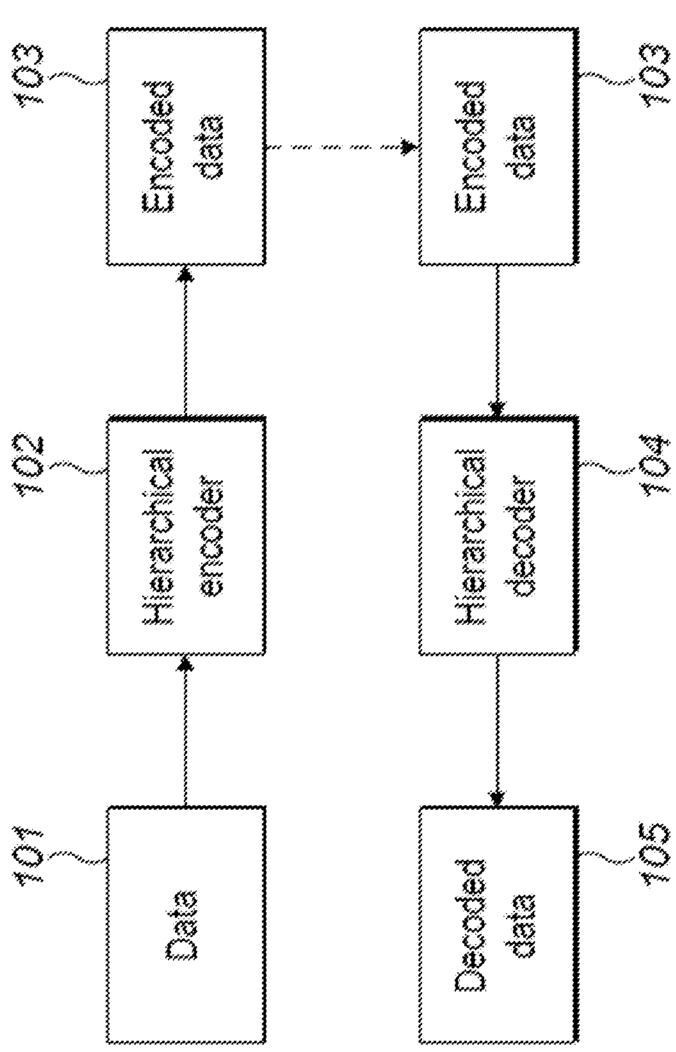
FIG. 1 shows a high-level schematic of a hierarchical encoding and decoding process.

Certain examples described herein relate to methods for encoding signals. Processing data may include, but is not limited to, obtaining, deriving, outputting, receiving and reconstructing data.

In certain comparative cases, filters are applied prior to downsampling an image to improve properties of the downsampled signal. For example, it is known in image processing to blur an image, e.g. using a Gaussian filter, prior to downsampling to prevent aliasing within the downsampled image. Aliasing, in this case, comprises perceivable distortions in a signal due to discrete signal changes rather than continuous changes. For example, a smooth yet thin curve or colour transition at a higher resolution may look jagged or blocky at a lower resolution following downsampling due to the selection of particular samples as part of the downsampling procedure. Typically, blurring prior to downsampling is recommended to improve the appearance of the downsampled image for a human viewer, e.g. as sharper changes become "smeared" over several pixels and so individual pixel selection matters less to the downsampled image.

Certain examples described herein operate on the surprising notion that within hierarchical image coding, input signals, such as frames of video, may be filtered prior to downsampling in a manner that may move away from a recommended filtering for a perceivable downsampled image yet enhance one or more encoded streams. For example, coding schemes like LCEVC and VC-6 that utilise one or more residual streams may benefit from filtering prior to downsampling to change a distribution of residual signals that are generated using the downsampled signal and improve encoding efficiency.

In certain cases described herein, desired preprocessing may be achieved by cascading multiple pre-processing filters prior to downsampling. For a video signal, these pre-processing filters may be relatively simple processing operations that enable complex pre-processing effects with a reduced processing load, e.g. compared to pre-processing using more resource extensive large neural network architectures. In certain cases, a cascade of pre-processing filters may be implemented as a light-weight neural network architecture of two of more layers, e.g. with small (such as $N<5$) 2D convolutions and fast non-linear activation functions. The light-weight neural network architecture may be trained using an optimisation (e.g. loss) function of the residual data streams, such that the residual data streams are modified in a desired manner by the pre-processing.

Certain examples described herein provide a less complex means of generating a desired non-linear behaviour that does not require as much processing power and does not use as much energy. There pre-processing filters are simple and demand low processing power to implement. The low processing power requirements reduce energy consumption and are therefore practical impractical, for example, where the use of comparative complex non-linear processing when video conferencing from a mobile device would too quickly drain the battery of the mobile device.

According to an aspect of the invention, there is provided a method for video encoding. The method comprises downsampling at a downsampler, an input video stream from a first spatial resolution to a second spatial resolution. The second spatial resolution being lower than the first spatial resolution. A set of encoders encode signals derived from the input video stream at the first spatial resolution and at the second spatial resolution. A pre-processing stage to preprocess the input video stream prior to the downsampling. The pre-processing comprises the application of a blurring filter and a sharpening filter.

The pre-processing and the downsampling may implement a non-linear modification of the input video stream.

The pre-processing at the pre-processing stage may be controllably enabled or disabled.

The blurring filter and the sharpening filter may be cascaded in that order.

The blurring filter may be a Gaussian filter. The blurring filter may be a 1D separable 3-coefficient filter in each direction or a 2D 3×3 filter.

The sharpening filter may comprise an unsharp mask. The sharpening filter may be a 2D N×N filter, where N is an integer value. N may take a value of 3.

The sharpening filter may use adjustable coefficient to suit different processing requirements. For example, the centre and periphery values may be adjustable, only the periphery values may be adjustable or only the centre values may be adjustable. Certain coefficient values may be selected to increase or decrease the energy of the high frequencies. Additional coefficient values may be selected to modify the way in which full resolution details are separated from the mid-low frequencies. This then allows a controllable pre-processing operation based on a simple filter.

The set of encoders may implement a bitrate ladder.

The encoding at the set of encoders may comprise encoding a signal derived from the input video stream at the first spatial resolution using a first encoding method and a single derived from the input video stream at the second spatial resolution using a second method. The first encoding method and the second encoding method may be different. When different, the first and second encoding methods may generate at least part of an LCEVC encoded data stream.

The encoding at the set of encoders may comprise encoding a signal derived from the input video stream at the first spatial resolution using a first encoding method and a single derived from the input video stream at the second spatial resolution using a second method. The first encoding method and the second encoding method may be the same. The first encoding method and the second encoding method may generate at least part of a VC-6 encoded data stream.

The encoding at the set of encoders may comprise encoding a residual stream. The residual stream may be generated based on a comparison of a reconstruction of the input video stream at the first spatial resolution with the input video stream at the first spatial resolution. The reconstruction of the video stream at the first spatial resolution may be derived from a reconstruction of the video stream at the second spatial resolution.

The encoding at the set of encoders may comprise encoding the input video stream at the second spatial resolution.

The encoding at the set of encoders may comprise encoding a second residual stream. The second residual stream may be generated based on a comparison of a reconstruction of the input video stream at the second spatial resolution with the input video stream at the second spatial resolution. The reconstruction of the input video stream at the second spatial resolution may be derived from decoding the encoded input video stream at the second spatial resolution.

The method may further comprise a second downsampling at a second downsampler to convert the input video stream from the second spatial resolution to a third spatial resolution. The third spatial resolution may be lower than the second spatial resolution. Further pre-processing may be applied at a second pre-processing stage before the second downsampler.

The pre-processing at the pre-processing stage and at the second pre-processing stage may be enabled or disabled in different combinations.

One or more image metrics used by one or more of the set of encoders may be disabled when the pre-processing is enabled.

The pre-processing may be disabled when one or more of the set of encoders use peak-signal-to-noise (PSNR) or structural similarity index measure (SSIM) image metrics to encode.

There is provided a system or an apparatus for video encoding configured to perform the methods detailed above.

In certain cases there is a signal encoder comprising a plurality of neural network layers to receive data derived from an input signal for encoding, each neural network layer applying at least a set of weights to an input signal, each neural network layer comprising an activation function that is applied to an output, the activation function being a differentiable non-linear function, the plurality of neural network layers being communicatively coupled in series; a downsampler to convert data derived from an output of the plurality of neural network layers from a first sampling resolution to a second sampling resolution, the second sampling resolution being lower than the first sampling resolution; an interface to provide data derived from an output of the downsampler to a base encoder operating at the second sampling resolution or below; and a residual encoder to encode a residual signal computed from a comparison of data derived from the base encoder and data derived from an output of the downsampler, wherein an output of the base encoder and an output of the residual encoder form an encoding of the input signal, and wherein the plurality of neural network layers is trained based on an optimisation function, the optimisation function comprising a function of the residual signal. A method of signal encoding based on this signal encoder may also be provided.

In certain cases, the signal encoder above comprises a further residual encoder to encode a residual signal computed from a comparison of a reconstruction generated at the first sampling resolution and data derived from the input signal prior to the plurality of neural network layers, wherein the output of the base encoder, the output of the residual encoder, and the output of the further residual encoder form an encoding of the input signal, and wherein the plurality of neural network layers is trained based on an optimisation function, the optimisation function comprising a function of one or more of the residual signals encoded by the residual encoder and the further residual encoder.

There is provided a computer-readable medium comprising instruction which when executed cause a processor to perform the methods detailed above.

INTRODUCTION

Examples described herein relate to signal processing. A signal may be considered as a sequence of samples (i.e., two-dimensional images, video frames, video fields, sound frames, etc.). In the description, the terms "image", "picture" or "plane" (intended with the broadest meaning of "hyper-plane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, examples described herein often refer to signals that are displayed as 2D planes of settings (e.g., 2D images in a suitable colour space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality.

In order to achieve a high-fidelity reconstruction, coding methods may upsample a lower resolution reconstruction of the signal to the next higher resolution reconstruction of the signal. In certain case, different signals may be best processed with different methods, i.e., a same method may not be optimal for all signals.

In addition, it has been determined that non-linear methods may be more effective than more conventional linear kernels (especially separable ones), but at the cost of increased processing power requirements.

Examples of a Tier-Based Hierarchical Coding Scheme or Format

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695, published as WO2020/188273, (and the associated standard document) and the latter being described in PCT/GB2018/053552, published as WO2019/111010, (and the associated standard document), all of which are incorporated by reference herein. However, the concepts illustrated herein need not be limited to these specific hierarchical coding schemes.

FIG. 1 to FIG. 7 provide an overview of different example tier-based hierarchical coding formats. These are provided as context for the addition of further signal processing operations, which are set out in the Figures following FIG.

Figure 6:
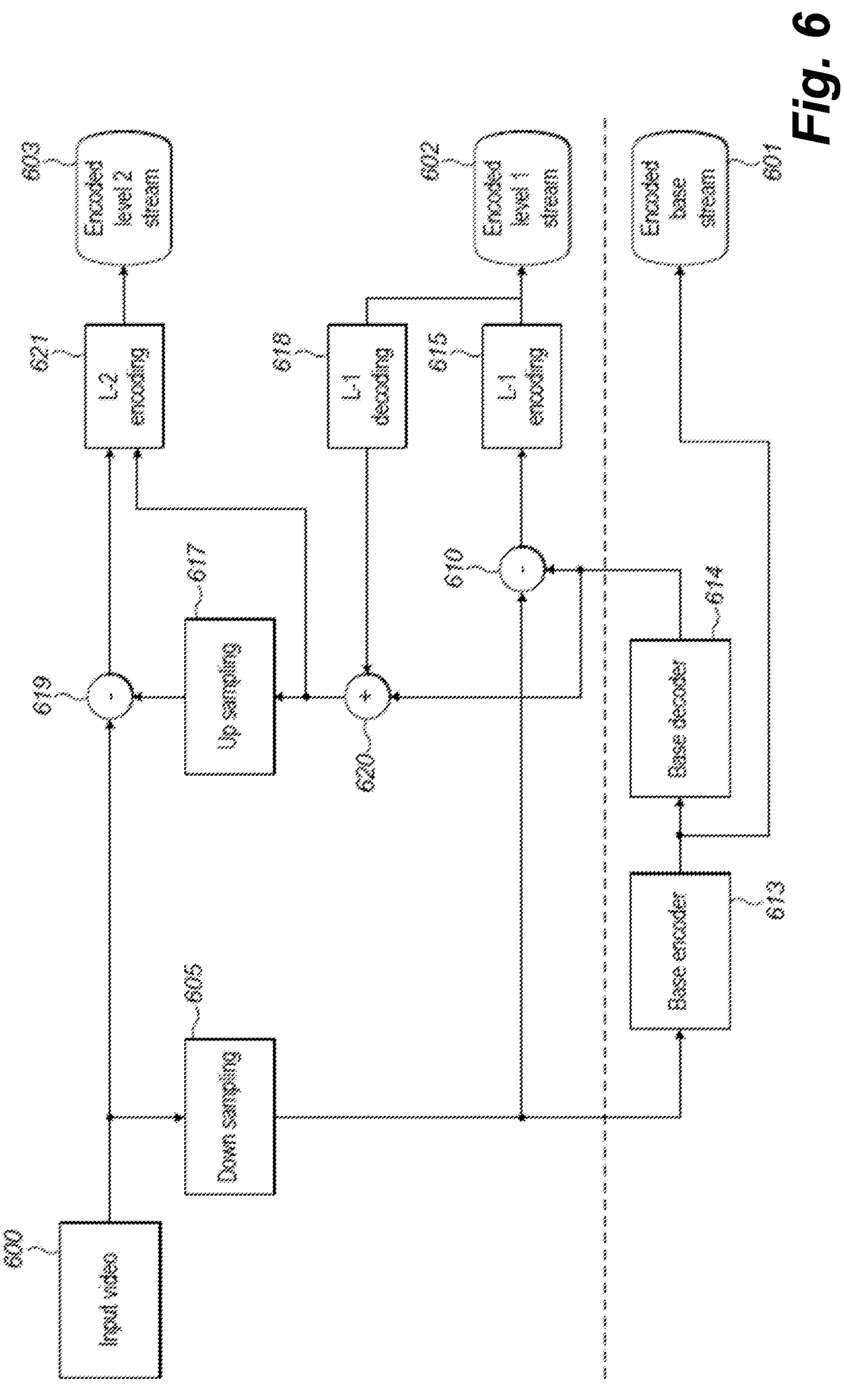
FIG. 6 shows a high-level schematic of an encoding process of a hierarchical coding technology; and, FIG. 7 shows a high-level schematic of a decoding process suitable for decoding the output of FIG. 6.
Figure 7:
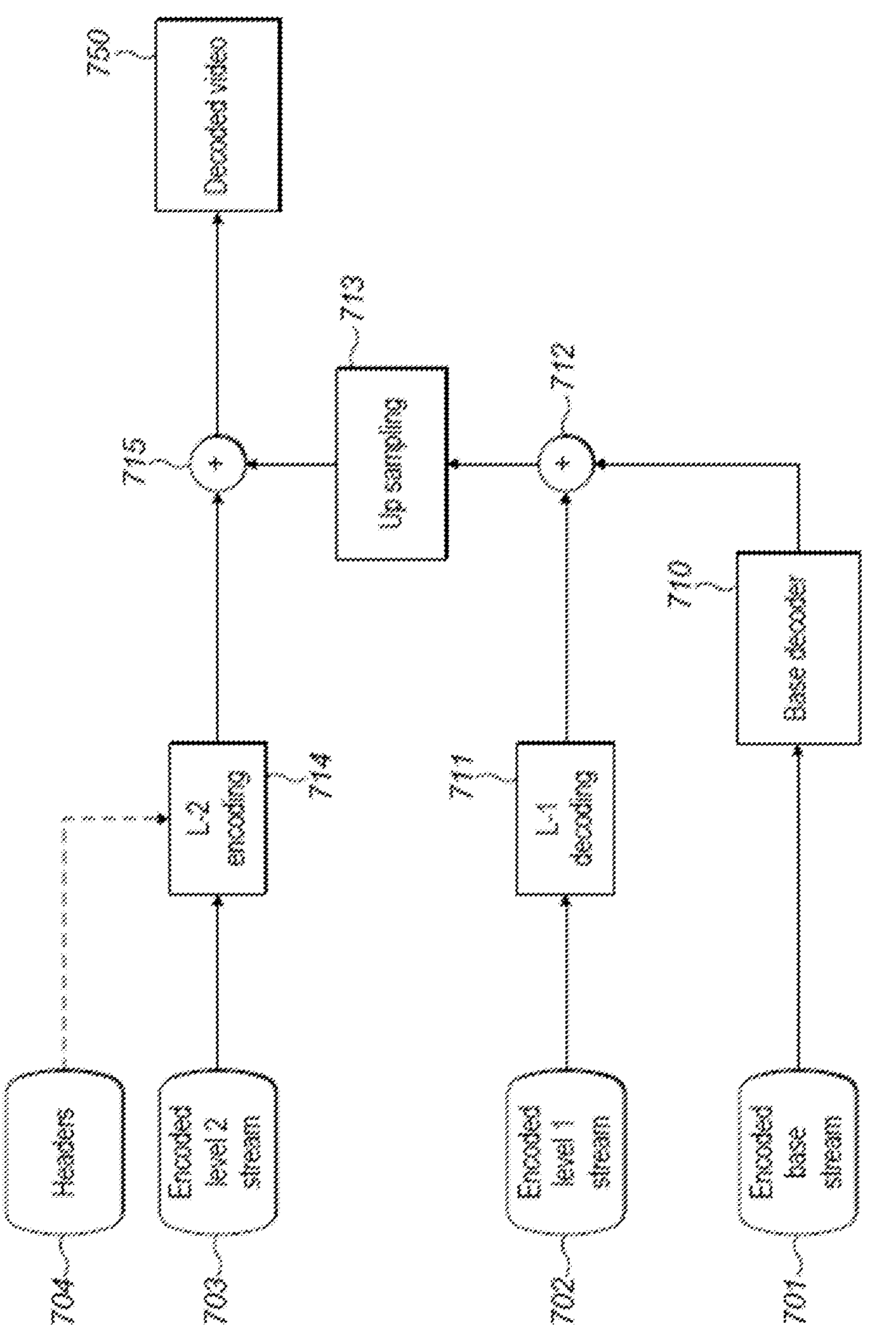

7. FIG. 1 to FIG. 5 provide examples similar to the implementation of SMPTE VC-6 ST-2117, whereas FIG. 6 and FIG. 7 provide examples similar to the implementation of MPEG-5 Part 2 LCEVC. It may be seen that both sets of examples utilise common underlying operations (e.g., downsampling, upsampling and residual generation) and may share modular implementing technologies.

FIG. 1 illustrates, very generally, a hierarchical coding scheme. Data to be encoded 101 is retrieved by a hierarchical encoder 102 which outputs encoded data 103. Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples, the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIG. 2 to FIG. and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
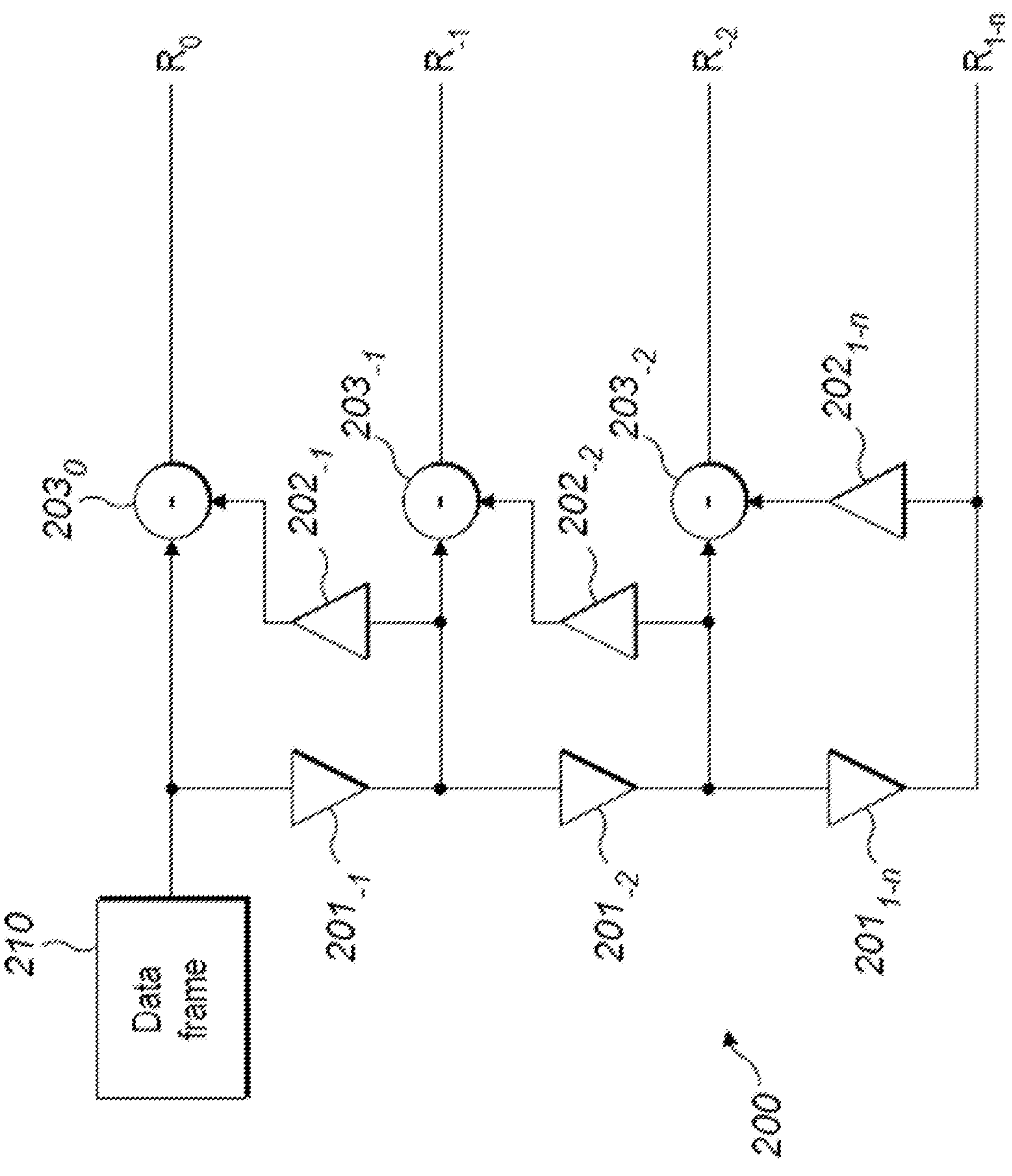
FIG. 2 shows a high-level schematic of a hierarchical deconstruction process.

As shown in FIG. 2, the encoded data represents a set of layers or levels, generally referred to here as echelon indices. The base or core level represents the original data frame 210, albeit at the lowest level of quality or resolution and the subsequent residuals data echelons can combine with the data at the core echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein with reference to FIGS. 2 to 7, there are 4 levels or echelon indices of output encoded data and accordingly 3 down-sampling operations, but it will of course be understood that these are merely for illustration. Where n indicates the number of levels, the number of down-samplers is n−1. The core level $R_{1-n}$ is the output of the third down-sampling operation. As indicated above, the core level $R_{1-n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $\mathbf{201}_{1-n}$ in the example may also be referred to as the core down-sampler as its output generates the core-echelon index or $\text{echelon}_{1-n}$, that is, the index of all echelons at this level is 1−n. Thus, in this example, the first down-sampling operation $\mathbf{201}_{-1}$ corresponds to the $R_{-1}$ down-sampler, the second down-sampling operation $\mathbf{201}_{-1}$ corresponds to the $R_{-2}$ down-sampler and the third down-sampling operation $\mathbf{201}_{1-n}$ corresponds to the core or $R_{-3}$ down-sampler.

As shown in FIG. 2, the data representing the core level of quality $R_{1-n}$ undergoes an up-sampling operation $\mathbf{202}_{1-n}$, referred to here as the core up-sampler. A difference $\mathbf{203}_{-2}$ between the output of the second down-sampling operation $\mathbf{201}_{-2}$ (the output of the $R_{-2}$ down-sampler, i.e. the input to the core down-sampler) and the output of the core up-sampler $\mathbf{202}_{1-n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
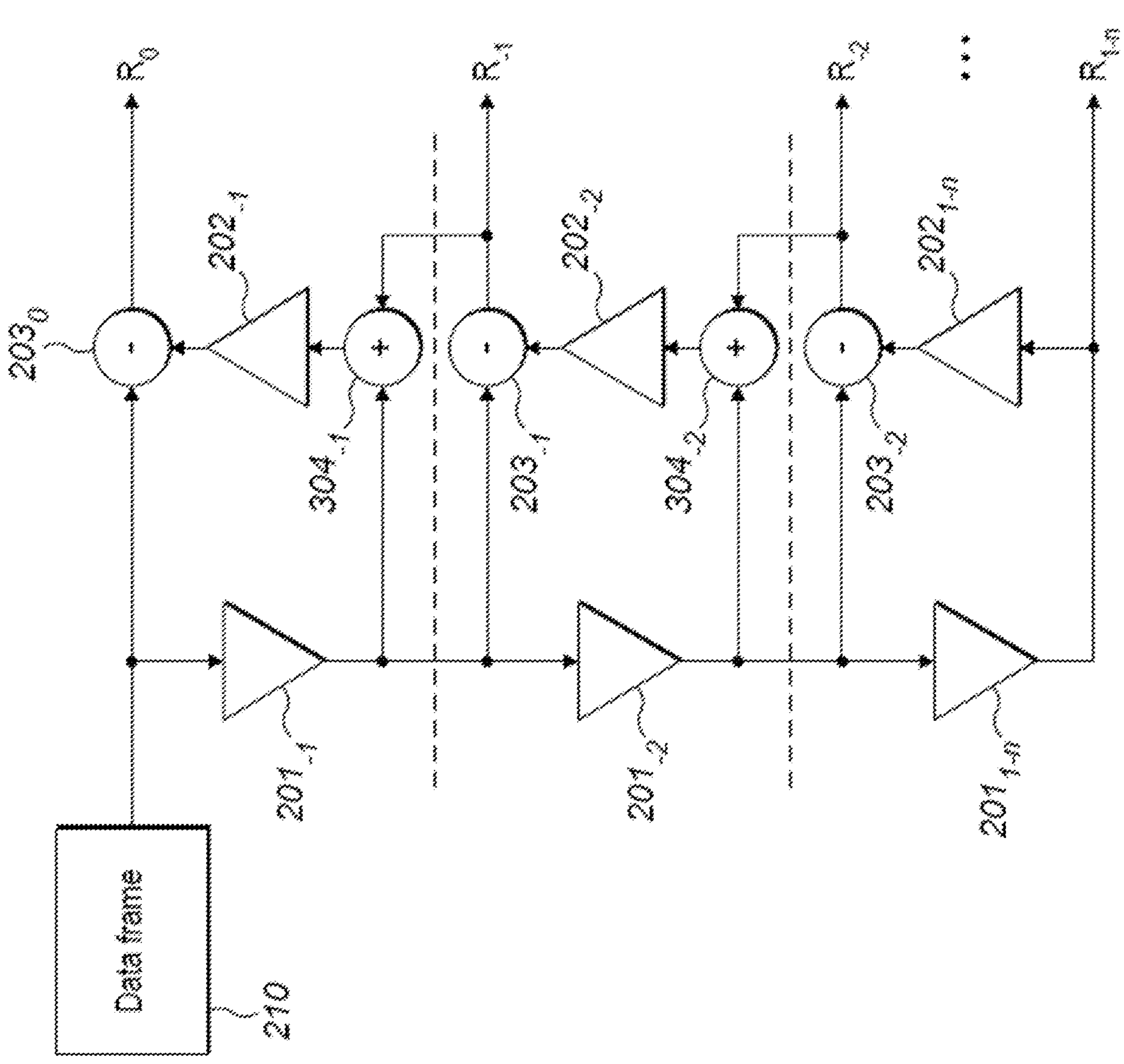
FIG. 3 shows an alternative high-level schematic of a hierarchical deconstruction process.

Variations in how to create residuals data representing higher levels of quality are conceptually illustrated in FIG. 2 and FIG. 3.

In FIG. 2, the output of the second down-sampling operation 201$_{-2}$ (or $R_{-2}$ down-sampler, i.e. the signal used to create the first residuals data $R_{-2}$), is up-sampled 202$_{-2}$ and the difference 203$_{-1}$ between the input to the second down-sampling operation 201$_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation 201$_{-2}$ (or $R_{-2}$ down-sampler) is combined or summed 304$_{-2}$ with the first residuals data $R_{-2}$ to recreate the output of the core up-sampler 202$_{1-n}$. In this variation it is this recreated data which is up-sampled 202$_{-2}$ rather than the down-sampled data. The up-sampled data is similarly compared 203$_{-1}$ to the input to the second down-sampling operation (or $R_{-2}$ down-sampler, i.e. the output of the $R_{-1}$ down-sampler) to create the second residuals data $R_{-1}$.

The variation between the implementations of FIG. 2 and FIG. 3 results in slight variations in the residuals data between the two implementations. FIG. 2 benefits from greater potential for parallelisation.

The process or cycle repeats to create the third residuals $R_0$. In the examples of FIG. 2 and FIG. 3, the output residuals data $R_0$ (i.e. the third residuals data) corresponds to the highest level and is used at the decoder to recreate the input data frame. At this level the difference operation is based on the input data frame which is the same as the input to the first down-sampling operation.

Figure 4:
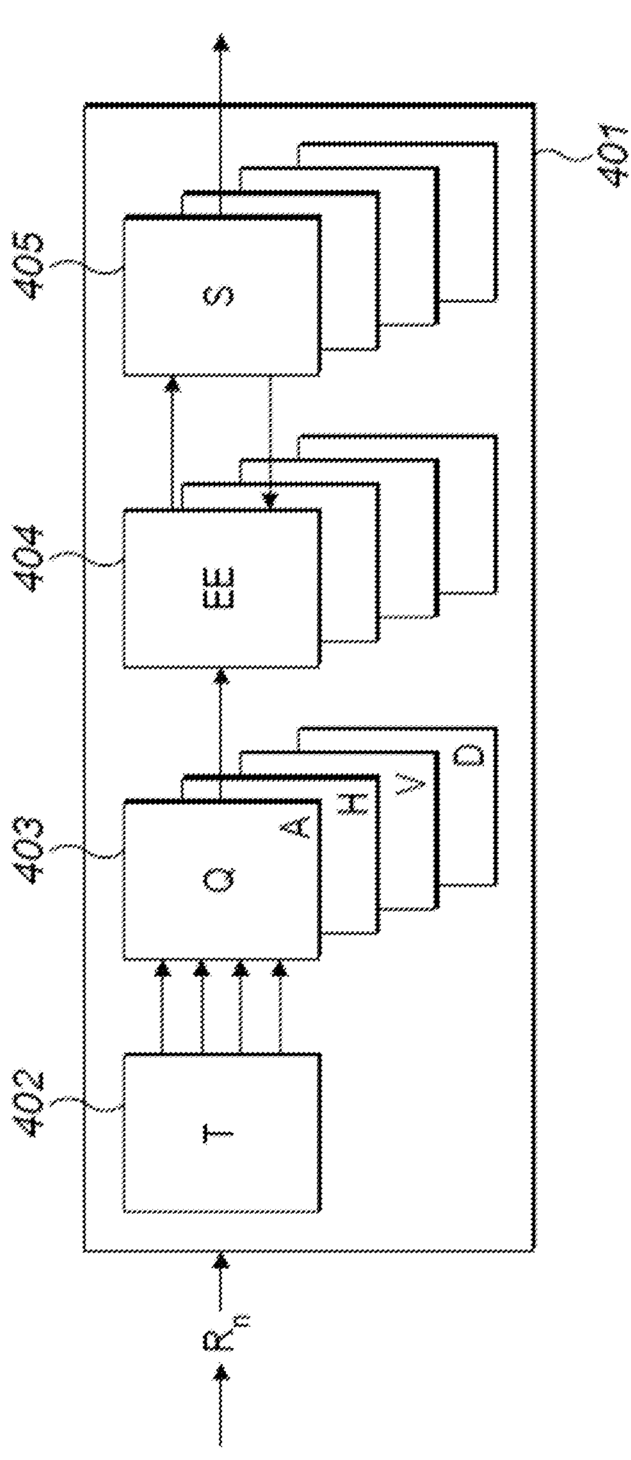
FIG. 4 shows a high-level schematic of an encoding process suitable for encoding the residuals of tiered outputs.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or FIG. 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2−N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon-3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance. The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

Figure 5:
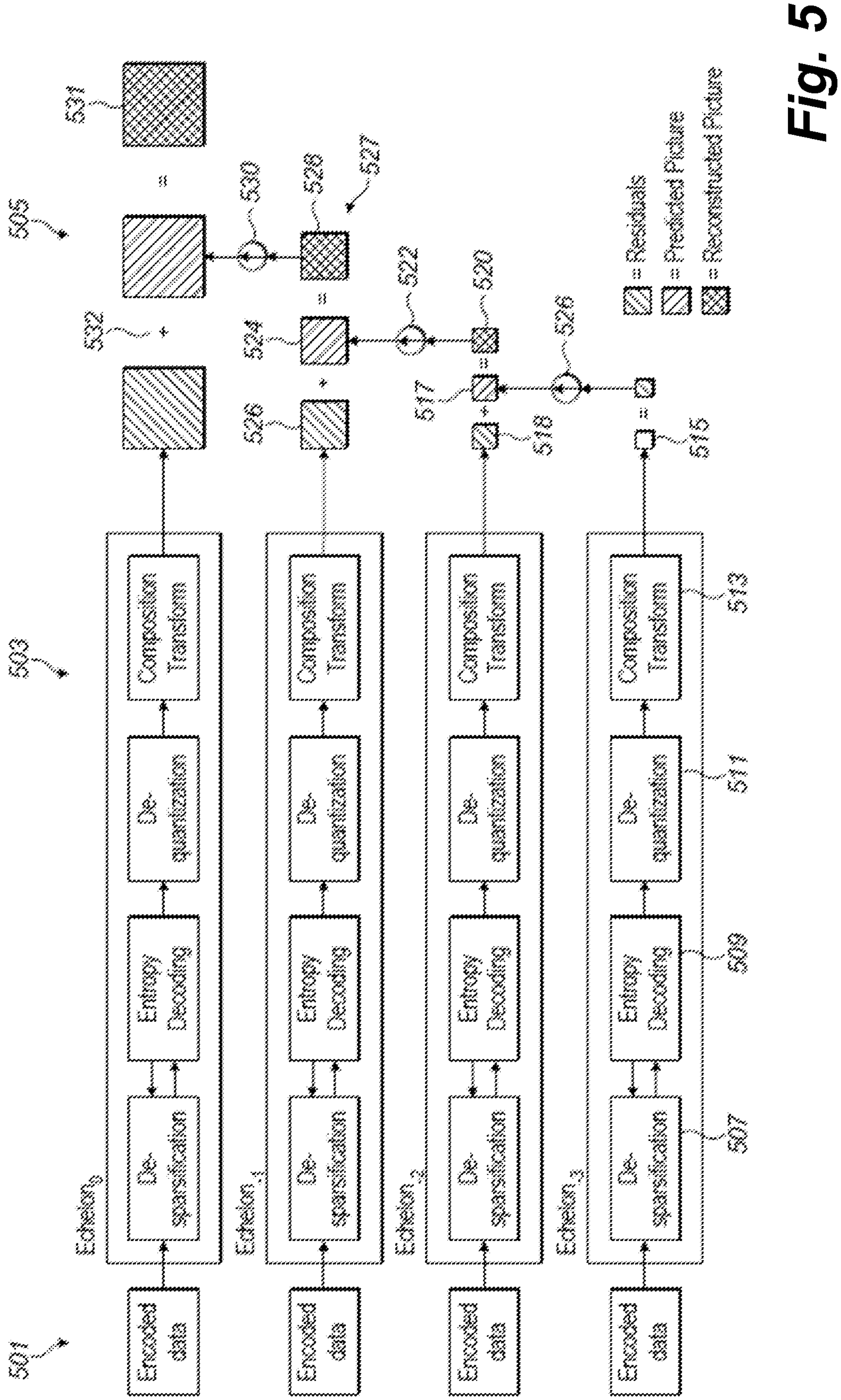
FIG. 5 shows a high-level schematic of a hierarchical decoding process suitable for decoding each output level from FIG. 4.

With reference to FIG. 5, a decoding example is now described. A set of encoded data 501 is received, wherein the set comprises four echelon indices, each echelon index comprising four echelons: from $echelon_0$, the highest resolution or level of quality, to $echelon_{-3}$, the initial echelon. The image data carried in the $echelon_{-3}$ component set corresponds to image data, and the other component sets contain residual data for that transmitted image. While each of the levels may output data that can be considered as residuals, the residuals in the initial echelon level, that is $echelon_{-3}$, effectively correspond to the actual reconstructed image. At stage 503, each of the component sets is processed in parallel so as to decode that encoded set.

With reference to the initial echelon index, or the core-echelon index, the following decoding steps are carried out for each component set $echelon_{-3}$ to $echelon_0$.

At step 507, the component set is de-sparsified. De-sparsification may be an optional step that is not performed in other tier-based hierarchical formats. In this example, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is image data for $echelon_{-3}$ and residual data for $echelon_{-2}$ to $echelon_0$.

Stage 505 illustrates the several cycles involved in the reconstruction utilising the output of the composition transform for each of the echelon component sets 501. Stage 515 indicates the reconstructed image data output from the decoder 503 for the initial echelon. In an example, the reconstructed picture 515 has a resolution of 64×64. At 516, this reconstructed picture is up-sampled so as to increase its constituent number of pixels by a factor of four, thereby a predicted picture 517 having a resolution of 128×128 is produced. At stage 520, the predicted picture 517 is added to the decoded residuals 518 from the output of the decoder at $echelon_{-2}$. The addition of these two 128×128-size images produces a 128×128-size reconstructed image, containing the smoothed image detail from the initial echelon enhanced by the higher-resolution detail of the residuals from $echelon_{-2}$. This resultant reconstructed picture 519 may be output or displayed if the required output resolution is that corresponding to $echelon_{-2}$. In the present example, the reconstructed picture 519 is used for a further cycle. At step 512, the reconstructed image 519 is up-sampled in the same manner as at step 516, so as to produce a 256×256-size predicted picture 524. This is then combined at step 528 with the decoded $echelon_{-1}$ output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon residual at stage 532. Thereby a 512×512 reconstructed picture 531 is obtained.

A further hierarchical coding technology with which the principles of the present disclosure may be utilised is illustrated in FIG. 6 and FIG. 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. Although the decoded output of the base codec is not intended for viewing, it is a fully decoded video at a lower resolution, making the output compatible with existing decoders and, where considered suitable, also usable as a lower resolution output.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input video 600 at an initial resolution is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals). The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input video which creates a further set of residuals (i.e. a difference operation is applied to the upsampled recreated stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g., either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an up-sampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIG. 6 and FIG. 7, the level 2 and level 1 encoding operations may include the steps of transformation, quantization and entropy encoding (e.g., in that order). These steps may be implemented in a similar manner to the operations shown in FIG. 4 and FIG. 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847, published as WO2013/171173 or PCT/GB2017/052632, published as WO2018/046941, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms. Hierarchically encoding a frame includes generating residuals for the full frame, and then a decimated frame and so on.

As indicated above, the processes may be applied in parallel to coding units or blocks of a colour component of a frame as there are no inter-block dependencies. The encoding of each colour component within a set of colour components may also be performed in parallel (e.g., such that the operations are duplicated according to (number of frames)*(number of colour components)*(number of coding units per frame)). It should also be noted that different colour components may have a different number of coding units per frame, e.g. a luma (e.g., Y) component may be processed at a higher resolution than a set of chroma (e.g., U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g., while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder. In the examples described herein residuals are encoded by an encoding pipeline. This may include transformation, quantization and entropy encoding operations. It may also include residual ranking, weighting and filtering. Residuals are then transmitted to a decoder, e.g. as L−1 and L−2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g., symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like “dots”, small “lines”, “edges”, “corners”, etc. that are visible in the residual images. It has been found that these features are typically not fully correlated (e.g., in space and/or in time). They have characteristics that differ from the characteristics of the image data they are derived from (e.g., pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g., transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g., 2×2 or 4×4 kernels—the Directional Decomposition and the Directional Decomposition Squared—as presented herein). The transform described herein may be applied using a Hadamard matrix (e.g., a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated transformed coefficients (e.g., in space) that may be efficiently compressed. While correlations between transformed coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Examples Relating to Enhancement of Downsampling

In certain exemplary embodiments described herein a downsampling operation, e.g. one or more of operations 201 in FIG. 2 and FIG. 3 or 605 in FIG. 6 (as well as other downsampling operations that are not shown), includes an optional enhancement operation in the form of a pre-processing stage prior to downsampling.

As described above, in a hierarchical coding system, such as the video coding schemes LCEVC and VC-6, it is desirable to control properties of one or more residual streams that are generated (e.g. an echelon as per FIG. 2 or 3, or one or more of the layer 1 and 2 residual streams shown in FIG. 6). In examples, the kernels of one or more pre-processing filters and a downsampling filter are different so as to produce a complex output from the downsampling filter. In certain examples, the combination of different filters provides for non-linear filtering and/or complex linear filtering. In certain cases, one or more of the pre-processing filters and the downsampling filter are non-linear functions. For example, a downsampling filter that selects one pixel from a group of pixels may provide a non-linearity. In other cases, one or more additional non-linear activation functions may be provided within the pipeline formed by a cascade of pre-processing filters and the downsampling filter so that the combination provides for a non-linear filtering.

In the examples below, a particular combination of a blurring filter and a sharpening filter prior to a downsampling operation, has been found experimentally to provide more efficient encoding of residual data at one or more levels. In these cases, the addition of the sharpening stage between blurring and downsampling is surprising as it would be seen to undo the effect of the blurring and further introduce aliasing. However, it has been found that, because the downsampled signal is to be encoded, e.g. by a lower or base level encoder, properties that make for a “good” perceivable image are not necessary those that make for an efficient residual encoding. Hence, the combination of blurring and sharpening provides a signal that is more efficient to encode by the lower or base level encoder and/or produces residual data that is more efficient to encode at the residual level (e.g. that is more efficiently encoded following transformation, quantisation and run-length or Huffman encoding). In some cases, the amount of residual data may be increased, but it may have a structure that is easier to encode, e.g. produce more features with a common quantisation level and/or more continuous horizontal, vertical and/or diagonal lines that lead to a sequence of transformed and quantised coefficients with the same value—e.g. an H, V or D surface/plane with long runs of common values that may be efficiently compressed. It has been found that the signal being passed for lower level encoding may even look disagreeable to a human perceiver (and so be avoided for use) yet generate more efficient encoding, e.g. in the form of a smaller bitstream and/or fewer processing operations.

Figure 8:
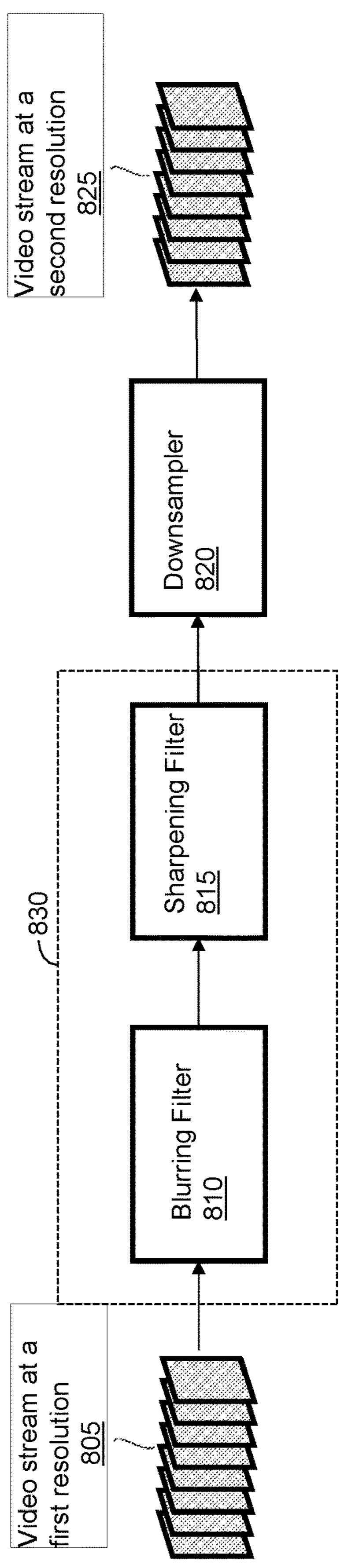
FIG. 8 shows in a block diagram a technique for pre-processing a video stream prior to downsampling said video stream.

FIG. 8 is a block diagram showing a technique for pre-processing a video stream prior to downsampling said video stream according to one exemplary embodiment. In a general form, a video stream at a first resolution 805 is pre-processed at pre-processing stage 830 and then downsampled at downsampler 820 to create a video stream at a second resolution 825 which is lower than the first resolution. The pre-processing stage 830 comprises a blurring filter 810 and a sharpening filter 815.

Figure 9:
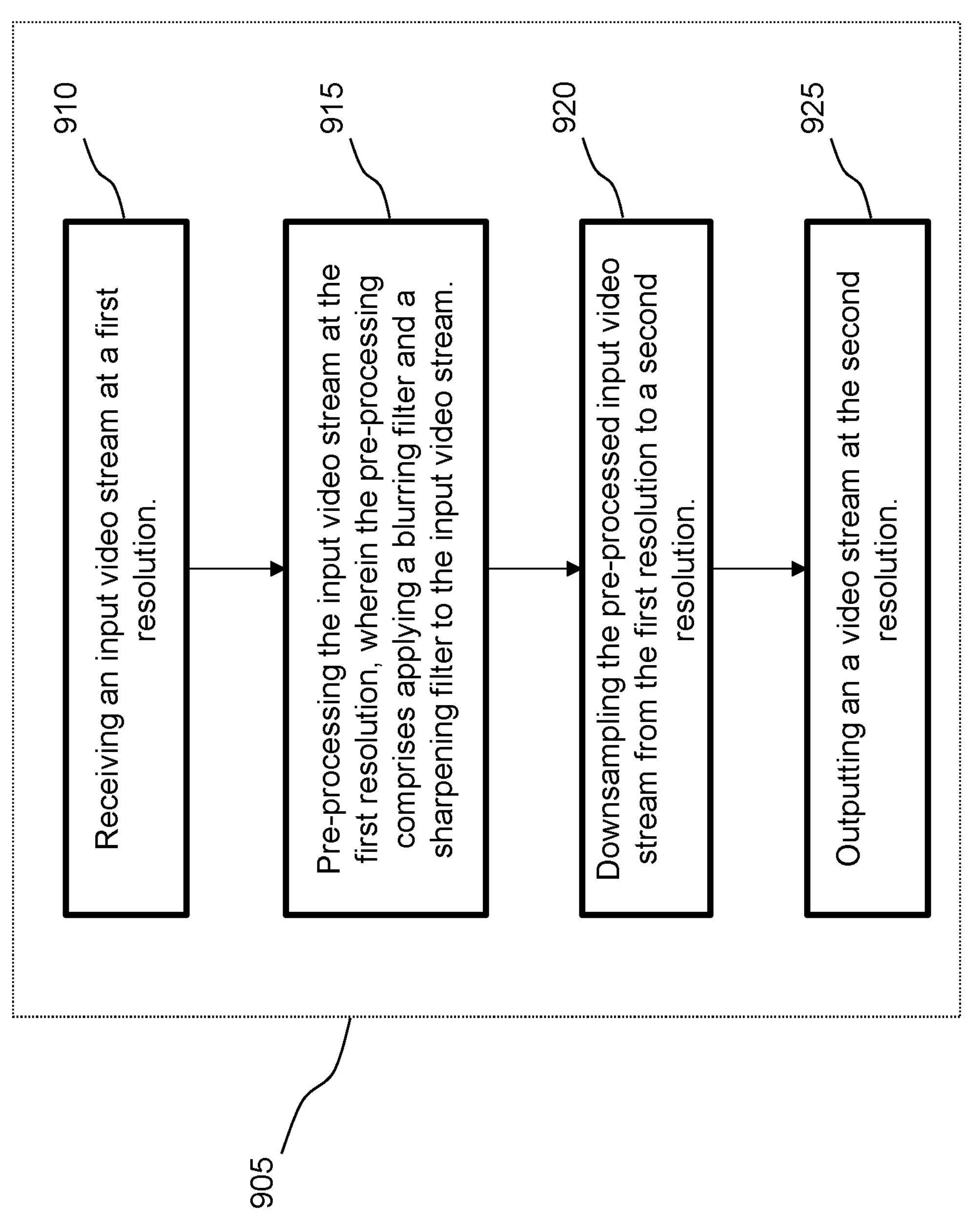
FIG. 9 shows in a flow chart a method for pre-processing a video stream prior to downsampling said video stream.

FIG. 9 depicts, in a flow chart, a method 905 for pre-processing a video stream prior to downsampling said video stream in accordance with the disclosure of FIG. 8. At 910, the method comprises receiving an input video stream at a first resolution. At 915, the received video stream is pre-processed using a blurring filter and sharpening filter. At 920, the pre-processed video stream is converted from a first resolution to a second resolution through downsampling. At 925, a video stream at the second resolution is outputted.

The video stream at the first and/or second resolutions is encoded as necessary by a set of encoders operating on signals at least derived from the input video stream at the appropriate resolutions, for example as discussed in relation to FIG. 1 to FIG. 7 above. The downsampler 820 may comprise any one of the downsamplers $\mathbf{201}_i$ in FIGS. 2 and 3 or 605 in FIG. 6.

A combination of the operators, i.e. the filters, before the downsampling provides improved image encoding and subsequent decoding. This is achieved at least in part because the blurring filter helps to reduce aliasing caused by the sharpening filter and/or the downsampler, and the sharpening filter helps to reduce the softening of the image caused by the downsampling. Overall, by the filters and downsampler working together, picture rendition is improved by being sharper without as much aliasing, with the additional benefit of relatively low processor demand and power consumption.

In certain cases, the pre-processing and the downsampling implement a non-linear modification of the input video stream In this way, there is provided a technique of generating a desired non-linear operation on the video stream by cascading a set of operators, possibly simple mathematical operators such as a blurring filter and a sharpening filter, prior to downsampling. A combination of the operators and the downsampling provides improved image encoding and subsequent decoding.

The first and second resolutions in this particular embodiment are spatial resolutions, however other resolutions may be usefully processed in this way, e.g. other forms of sampling rates and/or resolutions. Using the pre-processing on spatial resolution has particular advantage and effect in creating improved rendition of video when encoding and decoding, especially in hierarchical codecs.

In this exemplary embodiment, the pre-processing at the pre-processing stage is controllably enabled or disabled. One or more image metrics used by one or more of the set of encoders is disabled when the pre-processing is enabled. In one specific example, the pre-processing is disabled when one or more of the set of encoders use PSNR or SSIM image metrics to encode. In these cases, a lower level or base encoder may use image metrics to control the encoding. In the present examples, the pre-processing stage modifies the input frames to the lower level or base encoder in a manner that may lead to "poor" or unpredictable outputs for these image metrics, and so may affect any lower level or base encoding that uses values for these image metrics to control the encoding. This reflects the fact, as discussed above, that certain image metrics are configured to reflect human visual perception and the pre-processing may lead to an output of the downsampling that, according to human visual perception, is "poor". This is why it is surprisingly that even though the lower level or base encoding may be on a "poor" signal according to conventional image metrics, when reconstructed using residual streams within a hierarchical coding scheme, this "poor" signal can actually lead to an improved final reconstruction at the decoder and/or a predefined quality reconstruction with reduced processing and/or bitstream resources.

Referring again to FIG. 8, the blurring filter and the sharpening filter are cascaded in that order. The blurring filter may comprise a Gaussian filter. The blurring filter may be chosen from a 1D separable 3-coeffcient filter in each direction, or a 2D 3×3 filter. The sharpening filter may comprise a defined 2D N×N filter, where N is an integer value. N may take a value of 3. These filters may be convolved with the input signal as is known in the art. The sharpening filter may use adjustable coefficients to suit different processing requirements. For example, the centre and periphery values may be adjustable, only the periphery values may be adjustable or only the centre values may be adjustable. Certain coefficient values may be selected to increase or decrease the energy of the high frequencies. Additional coefficient values may be selected to modify the way in which full resolution details are separated from the mid-low frequencies, Specifically, in certain examples, the sharpening filter may comprise an unsharp mask. Of course, other suitable filters could be used. In one case, a 3×3 unsharp mask of the following form may be used.

| | | |
|---|---|---|
| 0 | −S | 0 |
| −S | C | −S |
| 0 | −S | 0 |

In this case, the sharpening filter of may be implemented as a convolution of the input image f (e.g. a frame representing a colour plane such as one of YUV) and a weighted Laplacian kernel L:

$$z=f*L$$

where f is the input image, z is the output (filtered) image, and L is the filter kernel as shown above. S and C are parameters that control the effect of the sharpening filter. In one case, S may be 1 and only C may be controlled. In other cases, C=4S+1. The parameter values (S and/or C) may be controlled during encoding. In these cases, the parameter values may comprise integer values or floating point values. In certain cases, 0≤S≤1, with S=0 corresponding to no filtering effect (i.e. z=f) and s=1 resulting in the strongest filtering effect. The value of S (and/or C) may be chosen either by a user configuration or it may be set dependent on the content being processed. In the latter case, the value of S or C may be varied per coding block (e.g. each 2×2 or 4×4 block of input signal). The filter may be called an unsharp mask, as it uses a negative blurred (or unsharp) version of an image as a mask to perform the sharpening, the mask being subsequent combined with the original image. In other examples, the sharpening filter may comprise any linear and/or non-linear sharpening filter. It will be appreciated that a blurring (e.g. Gaussian) filter may be applied as a set of 1D separable filters or a 2D filter in a similar manner.

As well as the hierarchical coding approaches discussed herein, in one implementation, one or more downsampling stages may be used to implement a bitrate ladder. For example, an arrangement of a set of encoders may receive respect downsampled signals and encode a plurality of encoded signal streams. In this case, the encoded signal streams may be full encoded signal streams (similar to the base encoded stream 601 in FIG. 6) as opposed to encoded residual or enhancement streams. In these cases, a bitrate ladder may be seen as a plurality of encoding associated with different encoding profiles or resolutions. For example, a video may be encoded at 1 mbps at 270p, 2 mbps at 480p, 3.2 mbps at 640p, 4 mbps at 720p and 5 mbps at 1080p where the original source video is at 1080p and the downsampling approach of FIG. 8 is used to generate each of the other resolution signals for encoding. In this case, the encoder may be a non-LCEVC or non-VC-6 encoder, such as AVC, HEVC, AV1, VVC etc.

In certain examples, blurring filter 810, sharpening filter 815 and downsampler 820 may be provided as a single package filter in any hierarchical tier-based codec. In one preferred embodiment, the pre-processing filters are combined with a linear downsampling kernel to generate the low resolution sources of an adaptive bitrate (ABR) ladder which would improve the quality of the ABR ladder regardless of the codec used for encoding.

Figure 10:
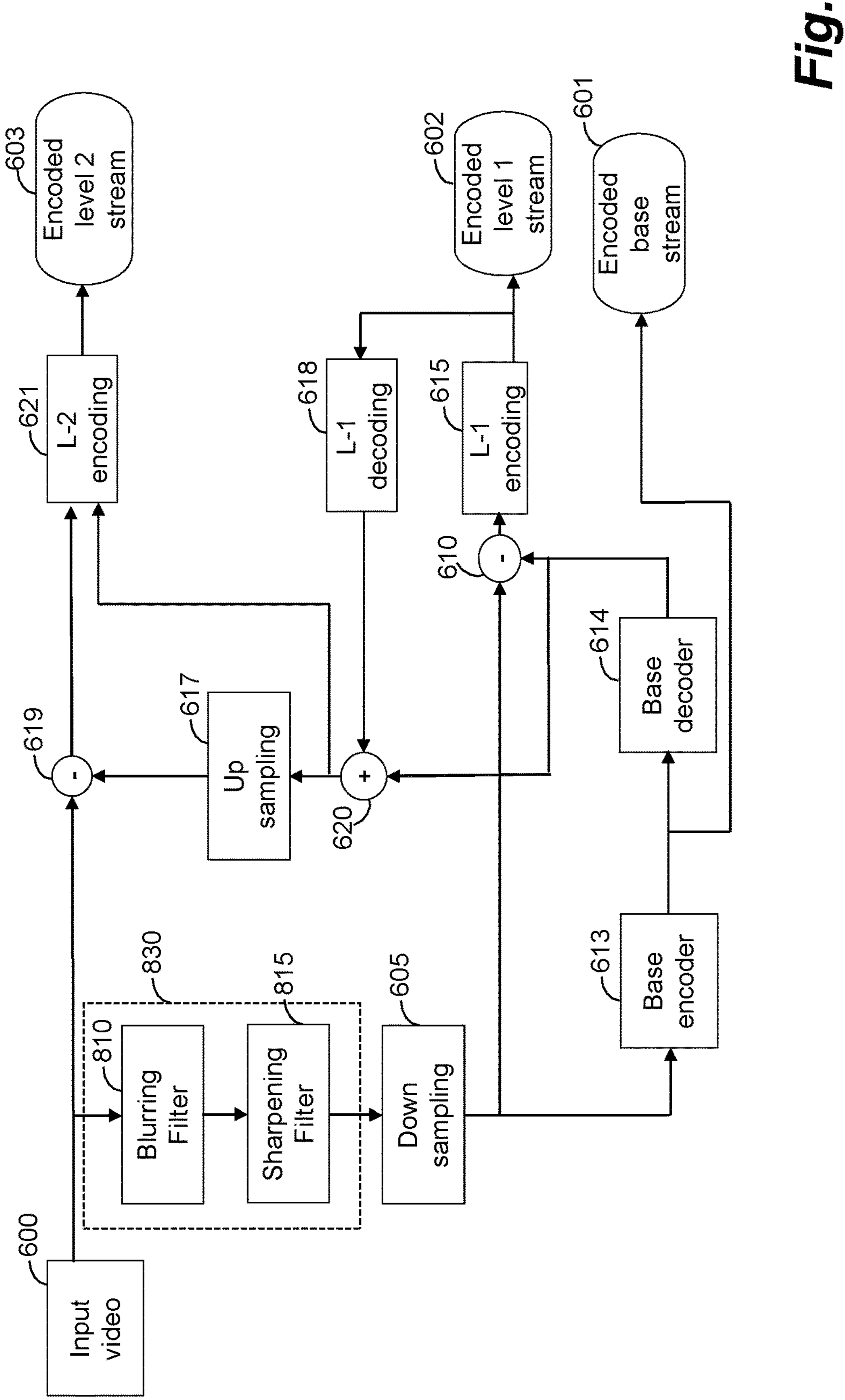
FIG. 10 shows in a high-level schematic the pre-processing demonstrated in FIG. 8 and FIG. 9 and implemented in the encoding process of FIG. 6.

FIG. 10 shows in a high-level schematic the pre-processing discussed with reference to FIG. 8 and FIG. 9. This example shows the general teaching of FIG. 8 and FIG. 9 implemented in the specific LCEVC encoding embodiment of FIG. 6. Of course, the general teaching is also applicable to the embodiments shown and described with reference to FIG. 2 and FIG. 3. In this exemplary embodiment, the details of FIG. 6 are not repeated and like reference numerals describe like components and arrangements. As can be seen in FIG. 10, the input video 600 is passed to the pre-processing stage 830 prior to downsampling block 605. As per FIG. 8, the pre-processing stage 830 comprises a blurring filter 810 in cascade with a sharpening filter 815. The blurring filter 810 and the sharpening filter 815 may be configured as described above.

Additionally, the encoding comprises encoding a signal derived from the input video stream at the first resolution using a first encoding method and a single derived from the input video stream at the second resolution using a second method. The first encoding method and the second encoding method are different in an LCEVC embodiment (see FIG. 6). When different, the first and second encoding methods may generate at least part of an LCEVC encoded data stream. The first encoding method and the second encoding method may be the same in a VC-6 embodiment (see FIG. 2 and FIG. 3). The first encoding method and the second encoding method may generate at least part of a VC-6 encoded data stream.

As will be apparent to the skilled reader, encoding comprises encoding a residual stream. The residual stream is generated based on a comparison 619 of a reconstruction of the input video stream at the first resolution with the input video stream at the first resolution. The reconstruction of the video stream at the first resolution is derived from a reconstruction of the video stream at the second resolution. Also, the input video stream is encoded at the second resolution using the base encoder 613 as already described with reference to FIG. 6 and FIG. 10. Also, encoding comprises encoding a second residual stream. The second residual stream may be generated based on a comparison 610 of a reconstruction of the input video stream at the second spatial resolution with the input video stream at the second spatial resolution. The reconstruction of the input video stream at the second spatial resolution is derived from decoding the encoded input video stream at the second spatial resolution.

Figure 11:
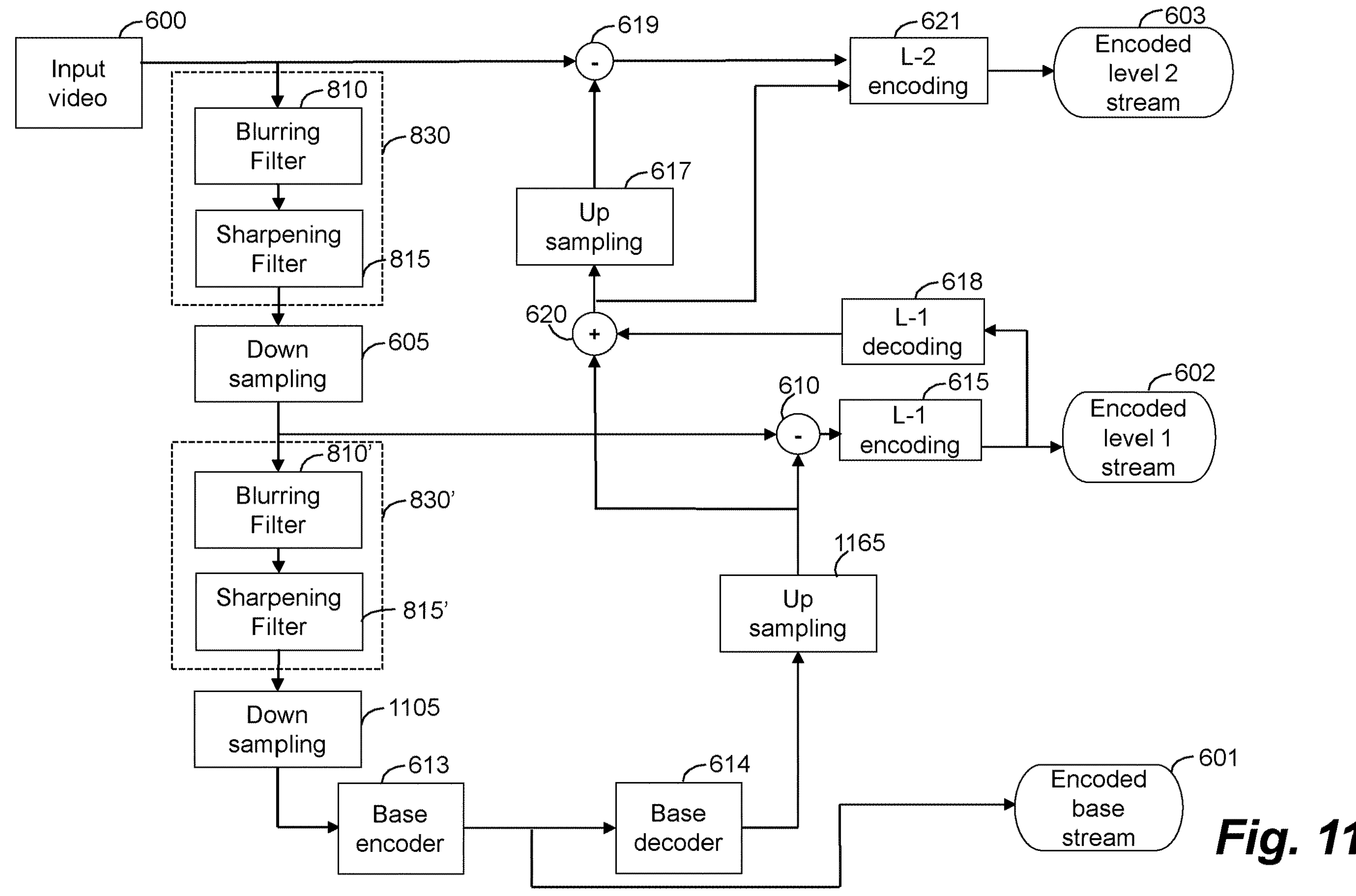
FIG. 11 shows in a high-level schematic a variation of the encoder architecture of FIG. 6 and FIG. 10 with additional sample conversion stages.

FIG. 11 shows in a high-level schematic a variation of the encoder architecture of FIG. 10. In this exemplary embodiment, the details of FIG. 10 (which are also derivable from FIG. 6) are not repeated and like reference numerals describe like components and arrangements. This example has an additional downsampling block 1105 which further downsamples the input video stream from the second resolution to a third lower resolution prior to encoding at the base encoder 613. Then, after decoding the encoded base stream 601 at base decoder 614, a further upsampling block 1165 upsamples the resulting signal to the second resolution. The output of the upsampling block 1165 then becomes the reconstructed input video stream at the second resolution and is used to generate the encoded level 1 stream 602 and the encoded level 2 stream 603 as discussed in relation to FIG. 6, and repeated with respect to FIG. 10.

In certain examples, a given down-sampler and up-sampler pairs at different stages are enabled or disabled in different combinations. In one case, a direction of scaling can be set, e.g. as per the horizontal-only down sampling/up-sampling described herein. If the second down-sampling block 1105 and the first up-sampling block 1165 are disabled, then the topology of FIG. 11 is that of FIG. 10.

In this example embodiment, there is a further pre-processing stage 830' which processes the input video at the second resolution prior to downsampling at additional downsampling block 1105. The further pre-processing stage 830' comprises a blurring filter 810' and a sharpening filter 815' as discussed in relation to pre-processing stage 830 above. The configuration of each pre-processing stage 830 and 830' are in this example the same, but the configurations may differ according to the implementation. Also, the filter parameters may differ (e.g. C and S above) and/or may be controllable independently.

The downsampling stage 605 may comprise a sub-sampling of the input pixel data and/or comprise the application of a linear downsampling kernel. The linear downsampling kernel may comprise one of a bilinear, bicubic, Lanczos, and a multi-lobe Lanczos kernel, amongst others. The kernel may be of a customisable size.

In this example the third resolution is lower than the second resolution.

The pre-processing at the pre-processing stage 830 and at the further pre-processing stage 830' may be enabled or disabled in different combinations. In other words, pre-processing stage 830 may be switched on while further pre-processing stage 830' may be switched off, or vice versa. Both pre-processing stages 830 and 830' may be on, or off, together. Use of the additional downsampling block 1105 allows the signal that is supplied to the base encoder 613 to be further reduced in size (e.g. reduced in vertical and/or horizontal spatial resolution). The additional downsampling block 1105 may be used to speed up a base encoding (as the signal to be encoded has fewer pixels) and/or reduce a bit rate of the encoded base stream 601 (possibly at the cost of an increased bit rate for the encoded level 1 stream 602 or the encoded level 2 stream 603). Having, multiple controllable scaling operations (in one or more dimensions) and being able to control the pre-processing for those scaling operations (e.g. in the form of filter parameters and/or on/off activations) may allow for complex fine grained control of the encoded signal streams 601, 602 and 603 while using only simple filtering approaches that can be implemented at a low-resource cost in low-resource devices (e.g. that do not use a large amount of battery power on a mobile device).

In one, one or more image metrics used by a base or lower level encoder may be disabled when the pre-processing stage 830 and/or further pre-processing stage 830' are enabled. Specifically, pre-processing stage 830 and/or further pre-processing stage 830' may be disabled when an encoder uses PSNR or SSIM image metrics to encode. In certain cases, a base or lower level encoder may use one or more image metrics (such as PSNR or SSIM) to control (e.g. optimise) an encoding. If one or more of the pre-processing stages 830 or 830' are applied this may result in poor performance on these metrics (which are designed to mirror perceptive rather than encoding quality). Poor performance on these metrics may interfere with the base or lower level encoding and so may be avoiding by turning off the pre-processing operations. More specifically, both pre-processing stages 830 and 830' are disabled when an encoder uses PSNR or SSIM image metrics to encode.

In certain examples, other image metrics may not be adversely affected by the pre-processing described herein. For example, Mean Opinion Score (MOS) and/or Video Multimethod Assessment Fusion (VMAF) metrics may not be adversely affected and so encoders that use these metrics may still be able to successfully perform metric-based encoding. In one case, the pre-processing may be controlled automatically based upon a selected set of encoder configurations.

As is known, non-linear techniques may be more effective at processing video signals than more conventional linear kernels (especially separable ones), but at the cost of increased processing power requirements. Therefore, an aspect of the current disclosure outlines a technique of generating a desired non-linear behaviour by cascading a set of operators (e.g. the filters) to create an approximation to non-linear behaviour in a processing efficient way.

In one variation of the above examples, one or more of the pre-processing stage and the pre-processing stage plus the downsampling stage may be replaced with an efficient light-weight neural network architecture. For example, one or more of the blurring filter 810 and the sharpening filter 815 may be replaced by one or more N×N convolution filters in a convolutional neural network. In one case, the filters described above may be replaced by a 3×3 trainable convolution filter. In one case, the initial weights may be calibrated based on the blurring and sharpening filter coefficients described above (in other cases, other initialisations may be used, such as random weights). One or more activation functions may also be used. For example, a non-linearity (or activation function layer) may be implemented between the first filter 810 and the second filter 815 and/or after the second filter 815 prior to downsampling. Downsampling may be implemented as a stride-selection with a configurable stride in one or more dimensions (e.g. a stride of 2 in each of the X and Y directions would perform a divide-by-2 downsampling) and/or may comprise a linear filter such as a Lanczos filter. In one case, a linear filter may be applied before a sub-sampling step.

A non-linearity as discussed above to be applied after one or more trainable filters may comprise any known non-linearity, such as a sigmoid function, a tanh function, a Rectified Linear Unit (ReLU), or an Exponential Linear Unit (ELU). Variations of common functions may also be used, such as a so-called Leaky ReLU or a Scaled ELU. In one example, the non-linearity layer may comprise a Leaky ReLU—in this case the output of the layer is equal to the input for values of input greater than (or equal to 0) and is equal to a predefined proportion of the input, e.g. a*input, for values of the input less than 0. In one case, a may be set as 0.2.

In the above examples, the convolution filter coefficients for the first filter 810 and the second filter 815 may be trainable based on an optimisation function that is a function of one or more residual data streams (e.g. a function of the outputs of one or more of comparators 610 and 619 in FIGS. 10 and 11). For the implementation of FIG. 11, filter coefficients for pre-processing stage 830' may be based on a function of the first residual stream output by comparator 610 and filter coefficients for pre-processing stage 830 may be based on a function of the first residual stream output by comparator 619. The function may comprise a loss function. The loss function may seek to minimise a metric based on the residual values (such as a sum or average) and/or may comprise a metric such as a bit rate of one or more of the encoded streams 602 or 603. Hence, in this example, coefficient values for the pre-processing blurring and sharpening filters may be learnt using neural network approaches (e.g. via standard gradient descent and back-propagation methods). As the filters may be very simple compared to large-scale neural network architectures (which may have many more layers and/or many more convolution filters), they may be trainable and implementable for real-time frame rate processing, and have the same low-resource benefits as the other examples.

The pre-processing described herein may be advantageously applied with an LCEVC encoder, i.e. an encoder that generates a stream of LCEVC data for decoding by an LCEVC decoder. In this case, the pre-processing settings may influence a combination of LCEVC encoder settings that affect the interlocked image processing effects of two or more of: a downsampler filter, an upsampler filter, the so-called "predicted residuals" computation (see for example WO2020/188242, which is incorporated by reference herein), and one or more of the residual data streams. The pre-processing approaches described herein allow for non-linear and/or content adaptive downsampling methods as well as custom content- or context-adaptive upsampling methods (for more detail of the latter see PCT/GB2020/052420, published as WO2021/064413, the contents of which are incorporated by reference herein). The "predicted residual" computation, as described in WO2020/188242 is used when generating an upsampled reconstruction prior to adding full resolution (e.g. highest level or level 2) residual data. On the decoding side, there is thus a further cascade of non-linear adaptive filters for upsampling that generate a form of simplified "super-resolution" upsampling. This simplified "super-resolution" upsampling is further corrected by the full resolution (or higher level/level 2) residual data (e.g. representing fine details) that could not be otherwise reconstructed (e.g. by the simplified upsampling per se), so as to approximate as closely as possible a lossless encoding (e.g. to best reconstruct an original input video signal).

Within a multi-layer encoding such as LCEVC, the overall compression efficiency as compared to a base codec used alone at full resolution (i.e. where the full resolution is the enhanced output resolution for LCEVC) arises, in part, from intelligently processing medium-to-low frequency features (a so-called "core" signal) and higher-frequency features (so-called "details"), where both sets of features may be separately compressed via a processing pipeline. In LCEVC, there are provided a set of low-complexity tools that are specifically designed to efficiently compress high-frequency details using light-weight parallel processing. These tools include the pre-processing approaches described herein, which affect how the medium-to-low frequency features are "separated". A traditional single-layer codec is used to compress the medium-to-low frequency features and this may be performed efficiently at a lower sampling rate, bit-depth and/or resolution.

The pre-processing approaches described herein, in combination with the residual encoding pipelines of LCEVC, and the bespoke upsampling methods referenced herein, allow for wide flexibility in calibrating the LCEVC compression. In certain cases, as the effective non-linear combination of resampling and signal decomposition performed by LCEVC may generate profound differences to conventional video input (e.g. for base encoding and/or in the form of the residual data streams for encoding), conventional "perceivable" visual quality, and visual quality metrics configured to approximate this "perceivable" visual quality, may be impacted. In these cases, LCEVC calibrations may be defined that provide for high quality reconstructions. This may comprise so called "tunings", sets of configuration parameters for LCEVC that provide configuration combinations that operate well in test conditions. These settings may involve the pre-processing settings described herein. In one case, the pre-processing described herein may be turned on and off by setting a "pre_processing_mode" setting. When set to "on", the pre-processing approaches described herein provide configurations that differ from basic linear kernels and provide a degree of control for one of the elements of the "chain reaction" of interlocked non-linear frame-processing tools that form part of an LCEVC encoder.

In one set of examples, a "pre_processing_mode" setting may take one of three values: "disabled", "replace" or "separate". A value of "disabled" indicates that the pre-processing stage is disabled (e.g. across the one or two levels shown in FIGS. 10 and 11). A value of "replace" indicates that a common set of pre-processing is applied for both residual surfaces, e.g. for both levels shown in FIG. 11. In this case, the pre-processing stages 830 and 830' use the same filter parameters (e.g. use the same sets of filter coefficients). A value of "separate" indicates that pre-processing is applied separately for both residual surfaces. For example, in this case, each of the pre-processing stages 830 and 830' use different filter parameters (e.g. use different sets of filter coefficients).

In certain examples, the pre-processing filters described herein may be configured using two parameters respectively representing a high-frequency strength (e.g. hf_strength) and a low-frequency strength (e.g. if_strength). These may correspond respectively to the S and C parameters above. The parameter for the high-frequency strength may accept a fractional value between 0 and 0.5, allowing an increase or decrease in the energy of high-frequency features within the filtered signal. Values close to 0 may be preferred for softer details within the video source. Default values may be set between 0 and 0.35. The parameter for the low-frequency strength may accept a fractional value between 0 and 1.0, influencing the way in which the higher-resolution details (e.g. high frequency features) are separated from the mid-to-low frequencies that are passed to the base codec. Default values may be set between 0 and 0.35.

Example Apparatus for Implementing the Encoder

Figure 12:
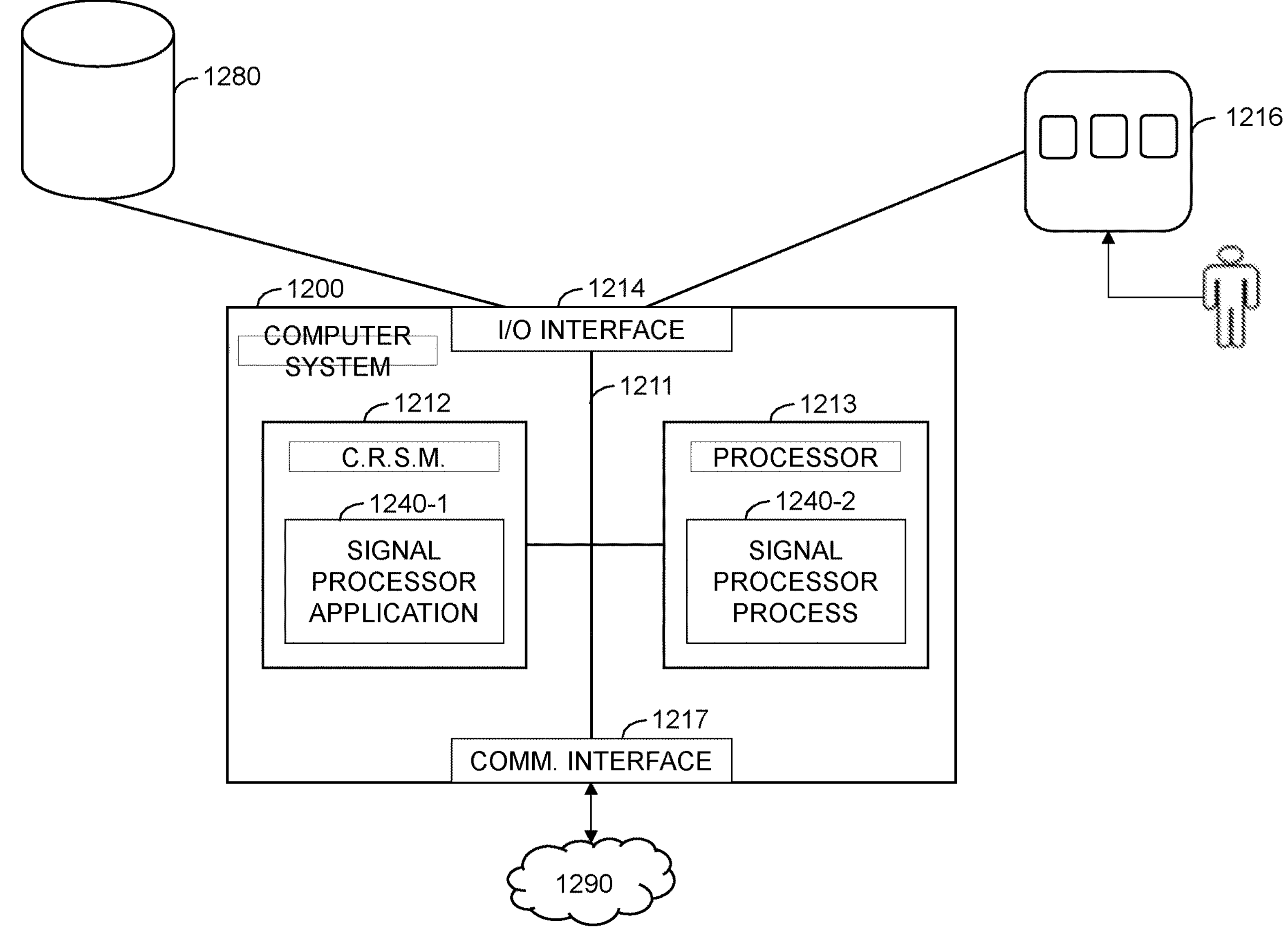
FIG. 12 shows a block diagram of an example of an apparatus in accordance with embodiments.

Referring to FIG. 12, there is shown a schematic block diagram of an example of an apparatus 1200.

Examples of the apparatus 1200 include, but are not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, a vehicle etc., or in general any type of computing or electronic device.

In this example, the apparatus 1200 comprises one or more processors 1213 configured to process information and/or instructions. The one or more processors 1213 may comprise a central processing unit (CPU). The one or more processors 1213 are coupled with a bus 1211. Operations performed by the one or more processors 1213 may be carried out by hardware and/or software. The one or more processors 1213 may comprise multiple co-located processors or multiple disparately located processors.

In this example, the apparatus 1213 comprises computer-useable memory 1212 configured to store information and/or instructions for the one or more processors 1213. The computer-useable memory 1212 is coupled with the bus 1211. The computer-usable memory may comprise one or more of volatile memory and non-volatile memory. The volatile memory may comprise random access memory (RAM). The non-volatile memory may comprise read-only memory (ROM).

In this example, the apparatus 1200 comprises one or more external data-storage units 1280 configured to store information and/or instructions. The one or more external data storage units 1280 are coupled with the apparatus 1200 via an I/O interface 1214. The one or more external data-storage units 1280 may for example comprise a magnetic or optical disk and disk drive or a solid-state drive (SSD).

In this example, the apparatus 1200 further comprises one or more input/output (I/O) devices 1216 coupled via the I/O interface 1214. The apparatus 1200 also comprises at least one network interface 1217. Both the I/O interface 1214 and the network interface 1217 are coupled to the systems bus 1211. The at least one network interface 1217 may enable the apparatus 1200 to communicate via one or more data communications networks 1290. Examples of data communications networks include, but are not limited to, the Internet and a Local Area Network (LAN). The one or more I/O devices 1216 may enable a user to provide input to the apparatus 1200 via one or more input devices (not shown). The one or more I/O devices 1216 may enable information to be provided to a user via one or more output devices (not shown).

In FIG. 12, a (signal) processor application 1240-1 is shown loaded into the memory 1212. This may be executed as a (signal) processor process 1240-2 to implement the methods described herein (e.g. to implement suitable encoders or decoders). The apparatus 1200 may also comprise additional features that are not shown for clarity, including an operating system and additional data processing modules. The (signal) processor process 1240-2 may be implemented by way of computer program code stored in memory locations within the computer-usable non-volatile memory, computer-readable storage media within the one or more data-storage units and/or other tangible computer-readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips or as an Application Specific Integrated Circuit (ASIC).

The apparatus 1200 may therefore comprise a data processing module which can be executed by the one or more processors 1213. The data processing module can be configured to include instructions to implement at least some of the operations described herein. During operation, the one or more processors 1213 launch, run, execute, interpret or otherwise perform the instructions.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. It will be appreciated that the apparatus 1200 may comprise more, fewer and/or different components from those depicted in FIG. 12. The apparatus 1200 may be located in a single location or may be distributed in multiple locations. Such locations may be local or remote.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for video encoding using a hierarchical coding format, the method comprising:

downsampling, at a downsampler, an input video stream from a first spatial resolution to a second spatial resolution, the second spatial resolution being lower than the first spatial resolution, wherein said downsampling includes a number of downsampling operations, and wherein the number of downsampling operations is selected to be one less than a number of echelon indices that are to be used as a part of the hierarchical coding format;

encoding, at a set of encoders, a signal derived from the input video stream at the first spatial resolution and a signal derived from the downsampled input video stream at the second spatial resolution; and pre-processing, at a pre-processing stage, the input video stream prior to the downsampling, wherein the pre-processing comprises the application of:

a blurring filter; and a sharpening filter, wherein the blurring filter and the sharpening filter, which are applied prior to the downsampling, are cascaded in that order prior to the downsampling, and wherein the pre-processing is configured to modify characteristics of residual data generated by the hierarchical coding format such that residual encoding efficiency is modified independently of perceptual image quality at the second spatial resolution.

2. The method of claim 1, wherein the pre-processing and the downsampling implement a non-linear modification of the input video stream.

3. The method of claim 1, wherein the pre-processing at the pre-processing stage is controllably enabled or disabled.

4. The method of claim 1, wherein the blurring filter is a Gaussian filter.

5. The method of claim 1, wherein the sharpening filter comprises an unsharp mask.

6. The method of claim 1, wherein the sharpening filter is a 2D N×N filter, where N is an integer value.

7. The method of claim 1, wherein the sharpening filter uses adjustable coefficient values.

8. The method of claim 1, wherein the set of encoders implement a bitrate ladder.

9. The method of claim 1, wherein the encoding at the set of encoders comprises encoding the signal derived from the input video stream at the first spatial resolution using a first encoding method and the signal derived from the downsampled input video stream at the second spatial resolution using a second method, wherein the first encoding method and the second encoding method are different.

10. The method of claim 9, wherein the encoded signals from the first and second methods are output as an LCEVC encoded data stream.

11. The method of claim 1, wherein the encoding at the set of encoders comprise encoding the signal derived from the input video stream at the first spatial resolution using a first encoding method and the signal derived from the downsampled input video stream at the second spatial resolution using a second method, wherein the first encoding method and the second encoding method are the same.

12. The method of claim 11, wherein the first encoding method and the second encoding method generate at least part of a VC-6 encoded data stream.

13. The method of claim 1, wherein the encoding at the set of encoders comprise encoding a residual stream, the residual stream being generated based on a comparison of a reconstruction of the input video stream at the first spatial resolution with the input video stream at the first spatial resolution, the reconstruction of the video stream at the first spatial resolution being derived from a reconstruction of the video stream at the second spatial resolution.

14. The method of claim 1, wherein the encoding at the set of encoders comprise encoding the input video stream at the second spatial resolution or lower, and wherein the encoding at the set of encoders further comprise encoding a second residual stream, the second residual stream being generated based on a comparison of a reconstruction of the input video stream at the second spatial resolution with the input video stream at the second spatial resolution, the reconstruction of the input video stream at the second spatial resolution being derived from a decoding of the encoded input video stream at the second spatial resolution or lower.

15. The method of claim 1, wherein the method further comprises a second downsampling at a second downsampler to convert the input video stream from the second spatial resolution to a third spatial resolution, the third spatial resolution being lower than the second spatial resolution, and applying the pre-processing at a second pre-processing stage before the second downsampler.

16. The method of claim 15, wherein the pre-processing at the pre-processing stage and at the second pre-processing stage are enabled or disabled in different combinations.

17. The method of claim 1, wherein one or more image metrics used by one or more of the set of encoders are disabled when the pre-processing is enabled, the one or more image metrics optionally comprising PSNR or SSIM image metrics.

18. The method of claim 1, wherein the number of echelon indices is 4, and wherein the number of downsampling operations is 3.

19. A system for video encoding using a hierarchical coding format, said system comprising:

one or more processors; and one or more computer hardware storage devices having stored thereon executable instructions that are executable by the one or more processors to cause the system to:

downsample, at a downsampler, an input video stream from a first spatial resolution to a second spatial resolution, the second spatial resolution being lower than the first spatial resolution, wherein said downsampling includes a number of downsampling operations, and wherein the number of downsampling operations is selected to be one less than a number of echelon indices that are to be used as a part of the hierarchical coding format;

encode, at a set of encoders, a signal derived from the input video stream at the first spatial resolution and a signal derived from the downsampled input video stream at the second spatial resolution; and pre-process, at a pre-processing stage, the input video stream prior to the downsampling, wherein the pre-processing comprises the application of:

a blurring filter; and a sharpening filter, wherein the blurring filter and the sharpening filter, which are applied prior to the downsampling, are cascaded in that order prior to the downsampling, and wherein the pre-processing is configured to modify characteristics of residual data generated by the hierarchical coding format such that residual encoding efficiency is modified independently of perceptual image quality at the second spatial resolution.

20. A non-transitory computer-readable storage medium comprising instructions that are executable by a processor to cause the processor to:

downsample, at a downsampler, an input video stream from a first spatial resolution to a second spatial resolution, the second spatial resolution being lower than the first spatial resolution, wherein said downsampling includes a number of downsampling operations, and wherein the number of downsampling operations is selected to be one less than a number of echelon indices that are to be used as a part of the hierarchical coding format;

encode, at a set of encoders, a signal derived from the input video stream at the first spatial resolution and a signal derived from the downsampled input video stream at the second spatial resolution; and pre-process, at a pre-processing stage, the input video stream prior to the downsampling, wherein the pre-processing comprises the application of:

a blurring filter; and a sharpening filter, wherein the blurring filter and the sharpening filter, which are applied prior to the downsampling, are cascaded in that order prior to the downsampling, and wherein the pre-processing is configured to modify characteristics of residual data generated by the hierarchical coding format such that residual encoding efficiency is modified independently of perceptual image quality at the second spatial resolution.

* * * * *